(12) United States Patent
McAllister et al.

(10) Patent No.: US 6,876,625 B1
(45) Date of Patent: Apr. 5, 2005

(54) METHOD AND APPARATUS FOR TOPOLOGY DATABASE RE-SYNCHRONIZATION IN COMMUNICATIONS NETWORKS HAVING TOPOLOGY STATE ROUTING PROTOCOLS

(75) Inventors: Shawn P. McAllister, Manotic (CA); Carl Rajsic, Nepean (CA)

(73) Assignee: Alcatel Canada Inc., Kanata (CA)

(*) Notice: Subject to any disclaimer, the term of this patent is extended or adjusted under 35 U.S.C. 154(b) by 489 days.

(21) Appl. No.: 09/663,793

(22) Filed: Sep. 18, 2000

(51) Int. Cl.[7] ................................. H04L 12/28
(52) U.S. Cl. .................. 370/221; 370/225; 370/254
(58) Field of Search ..................... 370/16.1, 84–85, 370/216, 223, 252, 254, 377, 410, 221, 225; 707/203–204; 709/201, 227; 713/501; 714/1–6

(56) References Cited

U.S. PATENT DOCUMENTS

| | | | |
|---|---|---|---|
| 5,473,599 A | | 12/1995 | Li et al. |
| 5,687,168 A | * | 11/1997 | Iwata ........................ 370/255 |
| 5,970,502 A | * | 10/1999 | Salkewicz et al. .......... 707/201 |
| 5,974,114 A | * | 10/1999 | Blum et al. .................... 379/9 |
| 6,230,164 B1 | * | 5/2001 | Rekieta et al. .............. 707/201 |
| 6,473,408 B1 | * | 10/2002 | Rochberger et al. ........ 370/255 |

OTHER PUBLICATIONS

Private Network–Network Interface Specification Version 1.0, af–pnni–0055.000, Mar. 1996, The ATM Forum Technical Committee, pp 47–172.*

Knight, et. al., "Virtual Router Redundancy Protocol" (The Internet Society, Network Working Group Request for Comments 2338, Apr. 1998).

Li, et. al, "Cisco Hot Standby Router Protocol (HRSP)" (The Internet Society, Network Working Group Request for Comments 2281, Mar. 1998).

Moy, J., "OSPF Version 2" (The Internet Society, Network Working Group Request for Comments 2328, Apr. 1998).

"Private Network–Network Interface Specification Version 1.0 (PNNI 1.0)", af–pnni–0055.000 (The ATM Forum, Technical Committee, Mar. 1996).

* cited by examiner

Primary Examiner—Wellington Chin
Assistant Examiner—John Shew
(74) Attorney, Agent, or Firm—McCarthy Tétrault LLP

(57) ABSTRACT

There is provided a method and apparatus for synchronization of topology state information between two network nodes in a communications network. The communications network has a routing protocol for intermittent advertisement of local state information throughout the network. The two network nodes include a requesting node which initiates a request for topology state synchronization and a replying node which receives the request. The replying node communicates with the requesting node to provide topology state information to the requesting node which is not possessed by the requesting node when the requesting node initiates its request. The method includes the step of selecting, prior to the request being made by the requesting node to the replying node, between a first and a second mode of synchronization. The first mode provides for topology state synchronization which entails withdrawal of the intermittent advertisement of local state information as it pertains respectively to the requesting node and to the replying node. The second mode provides for topology state synchronization which maintains the intermittent advertisement of local state information as it pertains respectively to the requesting node and to the replying node.

87 Claims, 4 Drawing Sheets

METHOD AND APPARATUS FOR TOPOLOGY DATABASE RE-SYNCHRONIZATION IN COMMUNICATIONS NETWORKS HAVING TOPOLOGY STATE ROUTING PROTOCOLS

FIELD OF THE INVENTION

The present invention relates generally to the field of network topology database re-synchronization in communications networks having topology state routing protocols and more particularly, to a method and apparatus for effecting network topology database re-synchronization in such networks. For example, the present invention is well-suited to database re-synchronization in the context of redundancy recovery following a nodal failure or a reset affecting an active routing entity associated with a network node.

BACKGROUND OF THE INVENTION

Topology state routing protocols are employed in communications networks in order to disseminate or advertise topology state information among nodes and node clusters within such networks. The advertised topology state information is in turn utilized to compute optimized paths for communications throughout a given network. As used in the present application, reference to topology state information signifies state information for the network domain as a whole. In certain network protocols, topology state information includes both link state information and nodal state information. For instance, link state information will include such attributes as link characteristics, link operational status, port identifiers and remote neighbour information concerning adjacent neighbour nodes. Nodal state information will include such attributes as node identifiers, peer group identifiers, distinguished node election status, distinguished node leadership status and local reachable address information.

Whereas topology state information will refer to state information for a network domain as a whole, the present application will make reference to local state information when dealing with state information which is locally originated by a particular network node. Local link status information will reflect a given node's understanding of the status of communication with its peer nodes. Thus, local link status information, similarly to topology link status information, will also include such attributes as link characteristics, link operational status, port identifiers and remote neighbour information concerning adjacent neighbour nodes, but these will pertain to a given network node as opposed to a variety of nodes forming part of a network domain. Likewise, local nodal state information will comprise such attributes as node identifiers, peer group identifiers, distinguished node election status, distinguished node leadership status and local reachable address information. Again, these will pertain to a given node when reference is made to local nodal state information, instead of pertaining to the network domain as a whole when reference is made to topology nodal state information. In the present application, reference to state information will signify both topology state information and local state information.

In some known topology state protocols, certain nodes in a communications network may take on distinguished or additional responsibilities in order to make the routing function for the network operate properly. For instance, in the Open Shortest Path First (OSPF) IP routing protocol as described in J. Moy: "OSPF Version 2", STD 54, RFC 2328, dated April 1998, a node identified as the Designated Router (DR) would assume such responsibilities. Similarly, in the Private Network-Node Interface or Private Network-to-Network Interface (PNNI) protocol, responsibilities of this nature are assumed by a node termed the Peer Group Leader (PGL). The PNNI protocol is specified in the documents entitled: (i) "Private Network Interface Specification Version 1.0", ATM Forum document no. af-pnni-0055.000 dated March 1996, (ii) "Private Network—Network Interface Specification Version 1.0 Addendum (Soft PVC MIB)", ATM Forum document no. af-pnni-0066.000 dated September 1996 and (iii) "Addendum to PNNI V 1.0 for ABR parameter negotiation", ATM Forum document no. af-pnni-0075.000 dated January 1997, together with amendments found in (iv) "PNNI V1.0 Errata and PICS, ATM Forum document no. af-pnni-0081.000 dated May 1997 (hereafter all of the foregoing documents (i) through (iv), inclusively, are collectively referred to as the "PNNI Specification"). The PNNI Specification is hereby incorporated by reference.

A given physical node within a network space may acquire distinguished network responsibilities of the type mentioned above by a process known as distributed election. In a scheme of distributed election, all nodes at a particular level of a network hierarchy will communicate to select the node which is to assume additional tasks or responsibilities in relation to the topology state protocol. Those skilled in this art will understand that performing the process of distributed election will take varying amounts of time depending on the particular network environment. As well, if due to downtime the distinguishing position is not being filled by a given network node, the routing functions of a portion of the network or of the network domain as a whole may exhibit reduced capabilities or inefficiency during the downtime interval. Thus, it can be expected that in communications networks which utilize topology state protocols, a recovery interval must be tolerated by the network routing system subsequent to the failure of a network node. For instance, this may occur to varying degrees of severity whenever the failed node impacts the functions of an elected network node having the additional responsibilities referred to earlier.

Certain routing protocols specify a given level of node redundancy. This redundancy is intended to reduce the recovery time of the network routing system in the event of a failure that affects a node which performs distinguished protocol functions of the kind mentioned previously. For example, in the OSPF protocol, the use of a Backup Designated Router (BDR) is specified. The Backup Designated Router is mandated to detect a failure affecting the currently appointed Designated Router. Upon detecting such a failure, the Backup Designated Router will be called upon to take recovery action to declare itself the new Designated Router in the place of the failed former Designated Router. All other routers on the affected portion of the shared network will thereafter be notified of the existence of the new Designated Router node. Thus, although it is not necessary to re-execute a dynamic election process under the OSPF protocol following a failure which impacts a Designated Router node, a network routing outage of some duration will nevertheless be experienced by all routers and hosts on the shared network that were originally served by the failed Designated Router node. This is because the affected routers and hosts participate in recovering the functions of the network routing system following a failure which impacts their associated Designated Router node.

On the other hand, in the PNNI protocol, no provision is currently made for distinguished node redundancy. As such, the distributed election process and its associated protocol actions must be re-executed upon any failure affecting a distinguished network node. In the PNNI protocol, a physical node which performs the Peer Group Leader function at one level of the topology hierarchy may be performing this function at several other levels of the hierarchy. Thus, a failure affecting such a physical node may very well impact a large part of the aggregated network. Furthermore, there is no provision in the current PNNI protocol for a backup Peer Group Leader. Thus, a failure which affects a multilevel Peer Group Leader of the kind described above must be detected by all logical nodes which form part of the various Peer Groups that are represented by the multilevel Peer Group Leader. These logical nodes at different levels of the network hierarchy must thereafter elect a new Peer Group Leader. As with the example given previously in relation to the OSPF protocol, the failure of the Peer Group Leader may be known to many nodes and hence such nodes must generally all participate in recovering the affected functions of the routing system. Given this, the failure of a Peer Group Leader in a PNNI network may conceivably impact a large portion of the network and may in many circumstances cause disruption of the routing behaviour of the network for a period of time which may be unacceptable to service providers or end users.

The discussion above has addressed the impact of a failure affecting a network node which has distinguished responsibilities. However, it will be appreciated by those versed in this art that a failure concerning an ordinary physical or logical node which does not possess distinguished responsibilities will also result in some measure of disruption to the routing capabilities of the neighbouring nodes or devices that are serviced by the failed ordinary node. Although in some node architectures it may be possible to retain certain network functions such as packet forwarding or call processing in the event of a routing function failure, topology state protocols such as OSPF and PNNI require each network node of a domain to synchronize a topology database with its neighbours before being admitted to the routing system. Such topology database synchronization must take place in these network protocols in order to recover from the failure of a node. The synchronization process may consume seconds or minutes in the overall scheme of recovery, depending on the circumstances. During the synchronization, network devices serviced by the failed node will be impacted and hence routing functionality may very well suffer disruption. While the discussion above has focussed on the challenges surrounding recovery from a nodal failure, those skilled in this art will understand that analogous problems arise stemming from other events which would require a node to undertake a synchronization of its topology database, for instance a reset of the routing processor associated with a network node.

Certain mechanisms have been developed in the prior art to ensure a switchover between distinct routers in a manner that is transparent to hosts which use a failed router. The Hot Standby Router Protocol described in T. Li, B. Cole, P. Morton and D. Li: "Cisco Hot Standby Router Protocol (HSRP)", RFC 2281, dated March 1998, and the IP Standby Protocol according to P. Higginson and M. Shand: "Development of Router Clusters to Provide Fast Failover in IP Networks", 9 Digital Technical Journal, No. 3, dated Winter 1997, are two examples of such transparent router switchover schemes. However, as will be explained in greater detail below, switchover mechanisms of this type do not generally ensure that the switchover will be universally transparent to the routers or nodes in the network beyond the particular hosts or nodes immediately adjacent the failed node. In the prior art, the failure of a node is typically recovered by means of a distinct and different node. It would therefore be advantageous to provide a mechanism that would allow the failure of a routing component of a node to be recovered by another routing component of the same node in a manner transparent to all nodes but its immediate neighbours.

Accordingly, prior art topology state routing protocols present problems and challenges when faced with a situation of recovery from a nodal failure or with other situations which may require a node to synchronize its topology database once it has previously done so, and these problems and challenges arise whether or not the node immediately affected by the failure has distinguished responsibilities. First, known recovery mechanisms typically disrupt the routing functions of at least a part of a network and cause a service impact to certain of the devices utilizing the network. The portion of the network affected will vary in the circumstances. For instance, the impacted portion of the network can be expected to be more extensive for a node performing distinguished functions than is the case for a node that does not perform such functions. As well, the impacted portion can be expected to be more expansive for a failure concerning a PNNI Peer Group Leader than for one which influences an OSPF Designated Router. Second, the time required to recover from a node or link failure will vary, but may be in the order of up to several minutes or longer. As mentioned above, this time frame may be unacceptable to certain service providers or end users. Third, since many nodes will have to be made aware of the failure and are therefore required to participate in the recovery process, network resources in the nature of bandwidth and processing time will be diverted. This will detract from other network activities in general and may decrease the performance and stability of the network routing system in particular.

It is therefore generally an object of the present invention to seek to provide a method and apparatus for database re-synchronization in a network having a topology state routing protocol, particularly well-suited to the context of redundancy recovery following a nodal failure associated with the routing entity of a network node, and pursuant to which some of the problems exhibited by alternative prior art techniques and devices may in some instances be alleviated or overcome.

SUMMARY OF THE INVENTION

According to a first broad aspect of the present invention, there is provided a method for recovery from a failure which affects an active routing entity in a communications network, the active routing entity being associated with a network node of the communications network, the communications network comprising a routing protocol for intermittent advertisement of local state information throughout the network and further comprising an inactive routing entity to which network connections of the network node can be diverted from the active routing entity upon the failure, the method comprising the steps of: (a) upon the failure, executing an activity switch between the active routing entity and the inactive routing entity, wherein network connections of the network node are diverted from the active routing entity to the inactive routing entity to thereby transform the inactive routing entity into a newly active routing entity; (b) following the activity switch, exchanging topology state information between the newly active routing entity and each immediately adjacent neighbour node of the network node associated with said failure such that the newly active routing entity and every said immediately adjacent neighbour node respectively possess synchronized topology state information; and wherein the exchange of topology state information between the newly active routing entity and each said immediately adjacent neighbour node is performed without withdrawal, by the network node associated with said failure and by each said immediately adjacent neighbour node, of the said intermittent advertisement of local state information as it pertains respectively to the network node associated with said failure and to each said immediately adjacent neighbour node.

According to a second broad aspect of the present invention, there is provided a network element for recovery from a failure in a communications network which includes a routing protocol for intermittent advertisement of local state information throughout the network, the network element comprising: an active routing entity, wherein the active routing entity is associated with topology state information concerning the communications network; an inactive routing entity, wherein an activity switch is executed between the active routing entity and the inactive routing entity upon failure of the active routing entity to thereby divert network connections from the active routing entity to the inactive routing entity and transform the inactive routing entity into a newly active routing entity; a database synchronization processor, wherein the database synchronization processor effects an exchange of topology state information between the newly active routing entity and each immediately adjacent neighbour node of the network element following the activity switch such that the newly active routing entity and every said immediately adjacent neighbour node respectively possess synchronized topology state information, and wherein the said exchange of topology state information between the newly active routing entity and each said immediately adjacent neighbour node is performed without withdrawal, by the network node associated with said failure and by each said immediately adjacent neighbour node, of the said intermittent advertisement of local state information as it pertains respectively to the network element and to each immediately adjacent neighbour node.

According to a third broad aspect of the present invention, there is provided a method for synchronization of topology state information between two network nodes in a communications network, the communications network comprising a routing protocol for intermittent advertisement of local state information throughout the network, the two network nodes comprising a requesting node which initiates a request for topology state synchronization and a replying node which receives said request and which communicates with the requesting node to provide topology state information to the requesting node which is not possessed by the requesting node when same initiates said request, the method comprising the step of selecting, prior to said request being made by the requesting node to the replying node, between a first and a second mode of synchronization, the first said mode providing for topology state synchronization which entails withdrawal, by the said requesting node and by the said replying node, of the said intermittent advertisement of local state information as it pertains respectively to the requesting node and to the replying node, and the second said mode providing for topology state synchronization which maintains the said intermittent advertisement of local state information as it pertains respectively to the requesting node and to the replying node.

According to a fourth broad aspect of the present invention, there is provided a network element for synchronization of topology state information between two network nodes in a communications network, the communications network comprising a routing protocol for intermittent advertisement of local state information throughout the network, the two network nodes comprising a requesting node which initiates a request for topology state synchronization and a replying node which receives said request and which communicates with the requesting node to provide topology state information to the requesting node which is not possessed by the requesting node when same initiates said request, the network element selectively operating in one of two modes of synchronization, wherein a first mode thereof effects topology state synchronization between the requesting node and the replying node which entails withdrawal, by the said requesting node and by the said replying node, of the said intermittent advertisement of local state information as it pertains respectively to the requesting node and to the replying node, and wherein a second mode thereof effects topology state synchronization between the requesting node and the replying node which maintains the said intermittent advertisement of local state information as it pertains respectively to the requesting node and to the replying node.

According to a fifth broad aspect of the present invention, there is provided a method for synchronization of topology state information between a first network node and a second network node in a communications network, the communications network comprising a routing protocol for exchange of local state information throughout the network, the first network node initiating a request for topology state synchronization and the second network node receiving said request and communicating with the first network node to provide topology state information to the first network node, the topology state synchronization taking place according to a first mode thereof wherein the said exchange of local state information, as it pertains respectively to the first network node and to the second network node, is not withdrawn.

According to a sixth broad aspect of the present invention, there is provided a network element for synchronization of topology state information between a first network node and a second network node in a communications network, the communications network comprising a routing protocol for exchange of local state information throughout the network, the first network node initiating a request for topology state synchronization and the second network node receiving said request and communicating with the first network node to provide topology state information to the first network node, the topology state synchronization taking place according to a first mode thereof wherein the said exchange of local state information, as it pertains respectively to the first network node and to the second network node, is not withdrawn.

DETAILED DESCRIPTION OF EMBODIMENTS OF THE INVENTION

Figure 1:
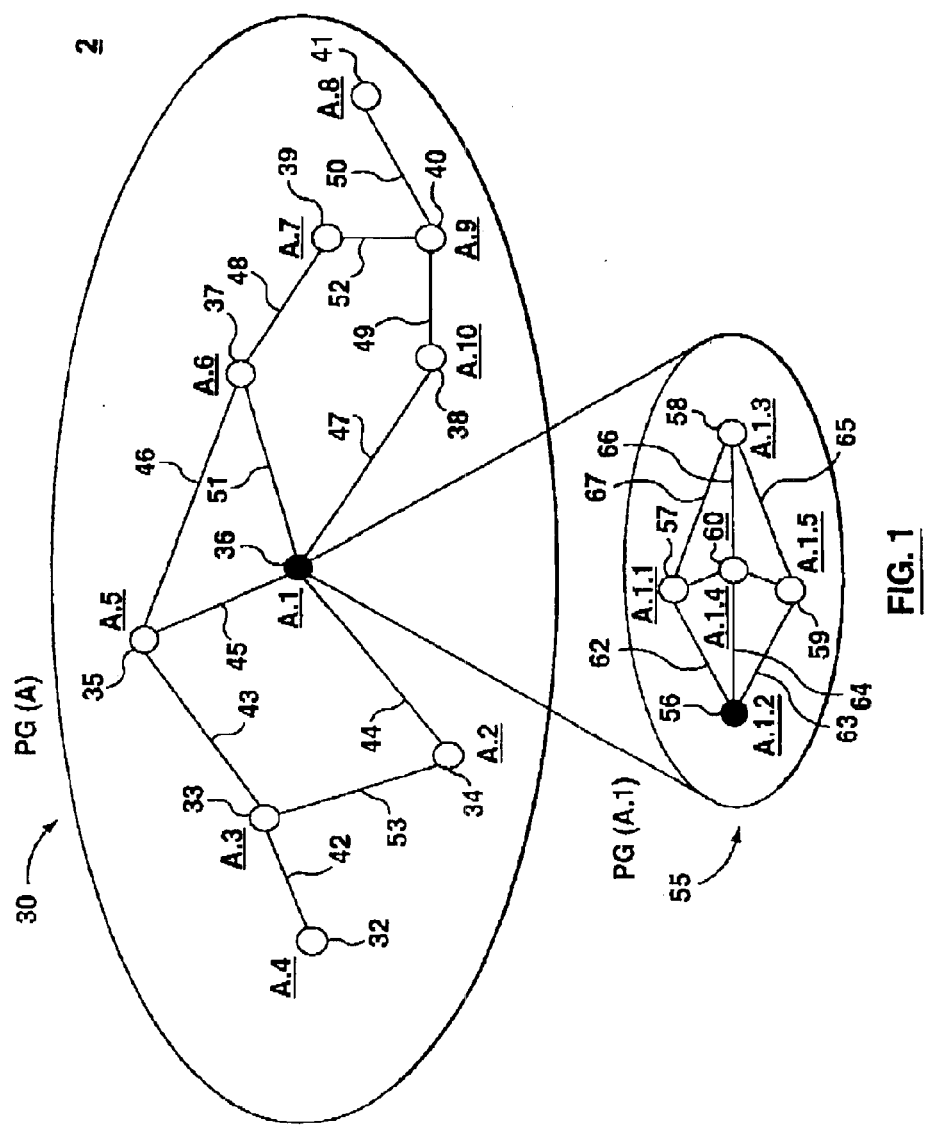
FIG. 1 is a schematic representation of a hierarchical network topology associated with a network domain operating according to the PNNI routing protocol in which the method and apparatus of the present invention may be implemented, and showing a parent-child relationship between groups of nodes forming part of the network topology.

Redundancy techniques for network components or devices, such as hot redundancy techniques, are generally well known to those skilled in this art. With reference to FIG. 1, these techniques will be explained using the illustrative example of a communications network in the form of a PNNI network domain 30. However, those skilled in this art will understand that the present invention may be applied or adapted to other types of networks as well, for instance Internet Protocol (IP) networks for which intermittent advertisement of local state information is accomplished by the Open Shortest Path First (OSPF) routing protocol. As well, the present invention is suited not only to situations of recovery from failures associated with a routing entity of a network node, but also to other contexts where it may be necessary or desirable for a network node to re-synchronize its topology database.

Topology State Routing Protocols and Topology Database Synchronization

The communications network 2 has a network domain 30 which is comprised of a plurality of network nodes 32 to 41, each of which typically are switching systems. The network nodes 32 to 41 are interconnected by way of physical or logical links 42 to 53 that respectively attach two given switching systems of the network domain. The network element or node 56 (also labeled "A.1.2") of the PNNI network domain 30 is shown as having assumed the role of Peer Group Leader for the parent Peer Group labelled "PG(A)", and the presence of node 36 at the level of the parent Peer Group is the consequence of the leader status of the node 56. Node 36 also represents a network domain in the form of the child Peer Group 55 (also labelled "PG(A.1)") which comprises lower-level network nodes 56 to 60. The lower-level network nodes 56 to 60 are interconnected by way of physical or logical links 62 to 67 each attaching two given lower-level switching systems. The functions which define the Peer Group Leader of PG(A.1) are implemented on the switching system which contains lower-level node 56 (also labelled "A.1.2"). PG(A.1) is a child peer group of PG(A) and is represented in PG(A) as a logical node 36, implemented within the physical switching system 56. Similarly, the parent Peer Group labelled "PG(A)" may itself be a child Peer Group represented at a higher level of the routing hierarchy by a single logical node (not shown).

According to known redundancy techniques, the particular node, switch or other network entity for which fault tolerance protection is desired usually provides at least two routing processors within a single network element. A routing processor performs the function of maintaining connectivity to its adjacent neighbour nodes and of sharing topology state information with those nodes. Preferably, the routing processors will be configured by way of distinct physical components. For instance, the physical components may each be in the form of distinct hardware cards provisioned within the same network switch, such as within the network node 56 ("A.1.2"). Where two processors are provided for redundancy purposes, one of the physical components in question will assume the role of the active routing entity for the redundant network element and the other of the physical components will thus be an inactive routing entity therefor.

Upon detecting the failure of the active routing entity, the inactive routing entity is called into service to take over the functions of the failed active routing entity. This procedure is termed an activity switch. Because both of these routing entities are associated with the same node (e.g. the network node 56), the node itself need not relinquish any of its distinguished responsibilities. As well, only immediate neighbouring nodes of the failed node in the form of immediately adjacent parent Peer Group nodes (e.g. the network nodes 34, 35, 37, 38) and any immediately adjacent child Peer Group nodes (e.g. the network nodes 57, 59, 60) need be called upon or otherwise enlisted to take part in network recovery. However, as discussed below, current topology state protocols may nevertheless cause more nodes than those immediately neighbouring the failed node to be impacted during the recovery process (e.g. the network nodes 32, 33, 39, 40, 41, 58), thereby increasing the time required for recovery to take place as well as the network resources consumed in the process.

Existing capabilities and techniques may be utilized to implement a scheme of redundancy protection in a given network architecture, such as the PNNI network domain 30. For instance, these capabilities and techniques may include the management of activity status within the various network nodes and the synchronization of state information between the active and inactive routing components. This state information for a network topology is typically stored in a synchronization database, also called a topology database, which is associated with each network node of a routing domain. Typically, the synchronization database will be stored within the network nodes in question. Database synchronization is an existing topology state routing protocol mechanism which ensures that adjacent nodes within a network share a common view of the overall topology of the network. Some signalling protocols, for instance ITU-T Q.2931, have mechanisms such as Status Enquiry schemes to perform a synchronization of the call state between two network nodes.

One problem with some known schemes of redundancy is that when a failure occurs at a network node such as node 56, which implements a higher-level node 36, the affected links in PG (A) 44, 45, 47 and 51 to and from the failed node stop being advertised after some time or while a new PGL in PG (A.1) begins taking over responsibility to implement higher level node 36. In other words, when the newly active routing processor initiates a database synchronization with its peers, the current PNNI protocol will call for the advertisement of local state information from each of the nodes involved in the synchronization to be removed or withdrawn until such time as the synchronization has taken place. Thus, the failed node will stop advertising its local state information and the nodes which neighbour the failed node will likewise stop advertising their respective local state information. This is true of any synchronization which is performed under the currently known protocol, where synchronization is required after an activity switch or a processor reset situation. In the existing PNNI protocol, a failed node that provides hot redundancy capability will be required to synchronize its topology database with neighbouring nodes. This is because the active and inactive routing processors of such a node will generally have exchanged topology state information internally prior to the failure, and this exchange will have taken place periodically. As such, there may very well be a loss of topology status information in the interval between the latest exchange of state information and the failure, which loss of information is experienced by the inactive routing processor upon the activity switch from the formerly active and failed routing processor.

When a failed node such as the node 56, which also implements higher level node 36 and which is provided with redundancy capability according to the prior art, is restarted by way of an activity switch, the newly active routing entity resulting from the activity switch must therefore reestablish the affected links 62, 63 and 64 to and from node 56 and the affected links 44, 45, 47 and 51 to and from the higher level node 36. Where a failed node such as the node 56 is a Peer Group Leader for a given number of child peer group nodes 56, 57, 58, 59 and 60, other links in the child peer group must also be re-established. In order to re-establish their existence as part of the network topology, a failed node and its neighbours must first learn of each other's presence. In the PNNI protocol, two-way Hello packets will accomplish this function of neighbour discovery in the case of lowest level peers connected by physical links or VPCs. Next, the failed node and each of its neighbours will exchange topology database summary information with one another. Typically in the PNNI protocol, the newly reacquainted nodes will first exchange PNNI Topology State Element (PTSE) headers to determine whether or not the nodes are in synchronization. If they are not, synchronization will take place. When a node receives PTSE header information that advertises a PTSE it does not yet have, it requests the advertised PTSE and updates its topology database with that requested PTSE once it is received.

Once synchronization is completed, local state information is advertised among the failed node and its neighbour nodes within the network topology of network domain 30, whereby each node will advertise its reachability to all other neighbour nodes. For example, in the PNNI protocol, this advertisement takes place by means of a regular process known as flooding. As previously explained, this known process of re-establishment adversely impacts upon the routing functions of the network. Moreover, network resources are consumed during re-establishment of the failed node 56 according to known techniques.

Figure 2:
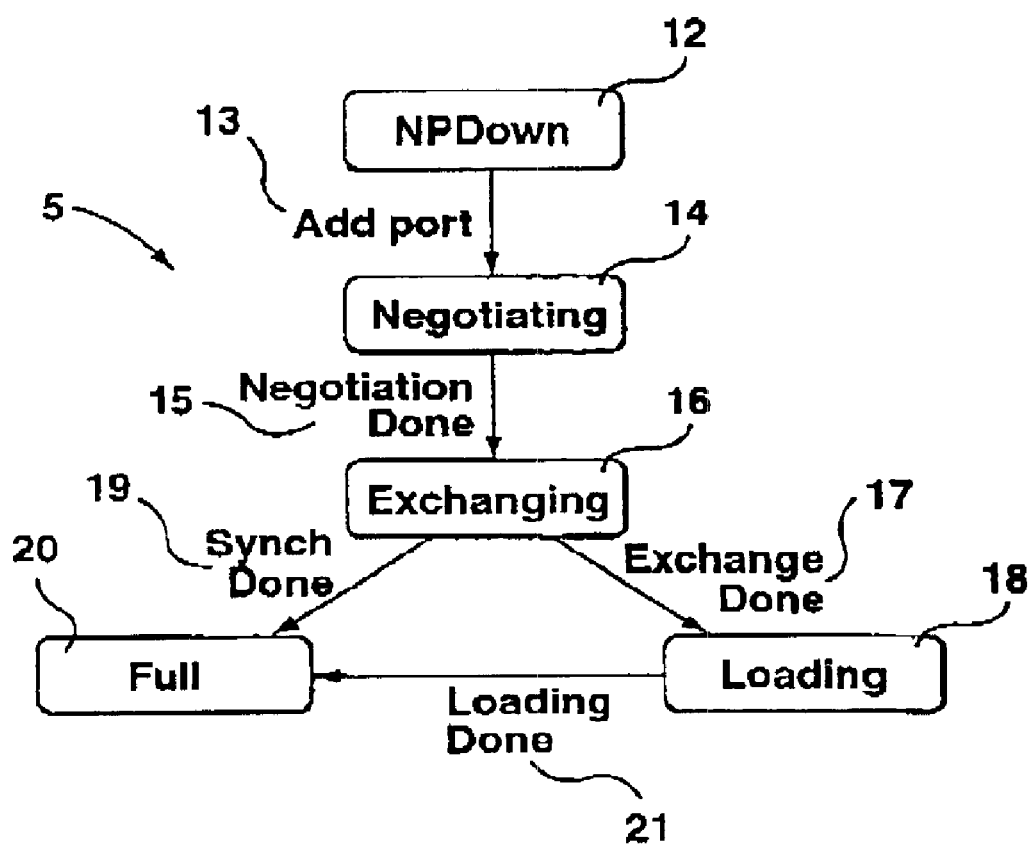
FIG. 2 is a state machine diagram which illustrates various states and transition events for a neighbouring peer Finite State Machine of the PNNI routing protocol as known in the prior art.
Figure 3:
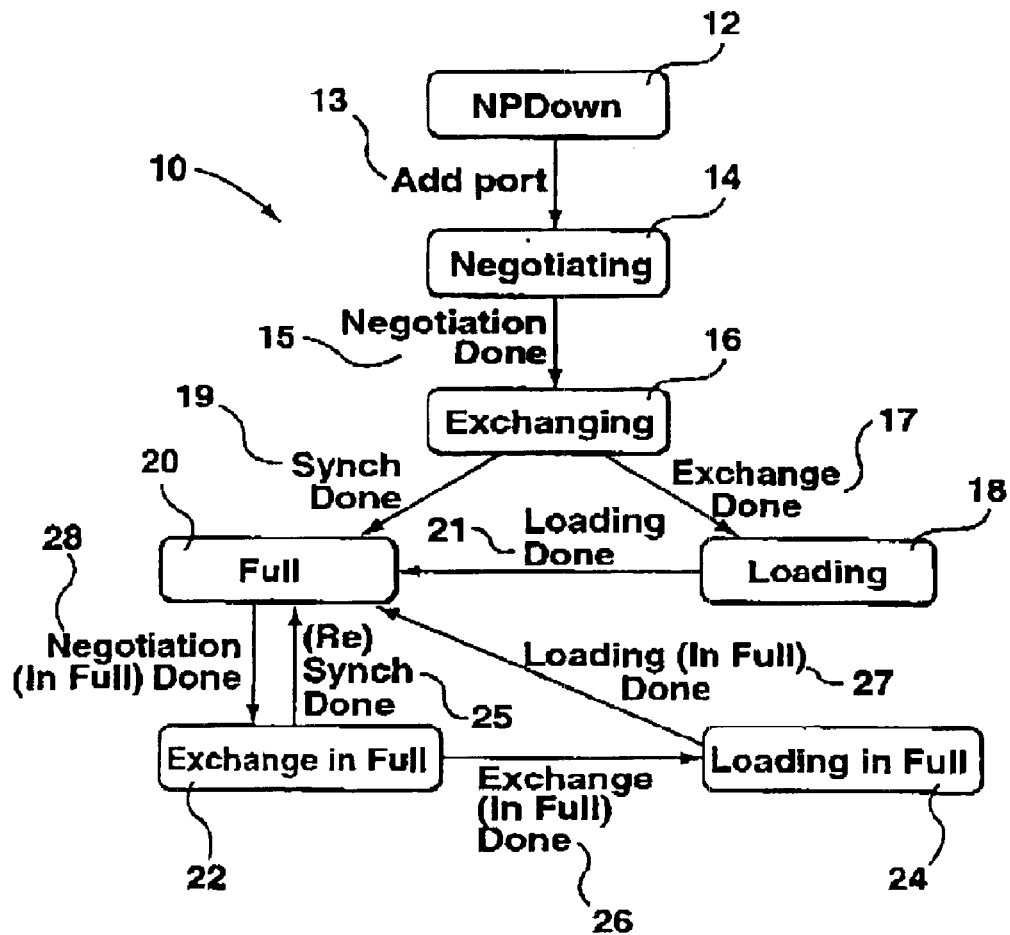
FIG. 3 is a state machine diagram which illustrates various states and transition events for a neighbouring peer Finite State Machine of the PNNI routing protocol as modified to implement the present invention.

Modifications to the Known Neighbouring Peer Finite State Machine, Neighbouring Peer Data Structure and Database Summary Packet Structure According to an illustrative embodiment, the invention may be adopted in the context of the PNNI protocol by making various modifications to the existing protocol of FIG. 2. As described in greater detail in what follows, these modifications generally relate to the known neighbouring peer Finite State Machine (FSM) 5 and its associated transition events, to other aspects of the neighbouring peer data structure and to the Database Summary packet structure. With reference to FIG. 3, two additional states for effecting database re-synchronization are defined for the modified neighbouring peer Finite State Machine 10. The additional states are termed the Exchange in Full State 22 and the Loading in Full State 24. The Exchange in Full State 22, the Loading in Full State 24 and their associated state transitions are described in greater detail below.

New transition events causing a neighbour peer state change are also added to the existing state transitions found at Section 5.7.3 of the PNNI Specification. These new state transitions may be termed the DS (Resynch) Mismatch event and the (Re)Synch Done 25 event. Other additional state transitions such as Negotiation (in Full) Done 28, Loading (in Full) Done 27 and Exchange (in Full) Done 26 are employed with the new states of the present invention. These additional state transitions respectively mirror the existing state transitions of Negotiation Done 15, Loading Done 21 and Exchange Done 17. This is explained in greater detail below with reference to Table 1. With the exception of the added states and state transitions which relate to them, the various states comprising the Finite State Machine 10 are otherwise as ordinarily defined in the PNNI Specification at Section 5.7.2 thereof.

The neighbouring peer data structure, which is normally present in the PNNI protocol and is defined at Section 5.7.1 of the PNNI Specification, is also modified according to the invention by the definition of an additional timer and associated timer interval when compared to the existing protocol. The additional timer and interval may be termed respectively the Resynch Inactivity Timer and the Resynch Inactivity Interval for convenience of description. When this new timed interval expires, it will signal a potential problem with a database re-synchronization. In such a case, the node re-synchronization will be required to perform a database synchronization from the Negotiating State 14, as would have normally occurred if the database synchronization had originally taken place in the existing PNNI protocol.

Lastly, an added bit is provided according to one implementation of the present invention for the Database Summary packet structure. The additional bit is described more fully below and may be termed a Synch in Full (SF) Bit. This added bit to the Database Summary packet structure is intended to signal to adjacent nodes that a re-synchronization is taking place, for example due to a failure of a routing entity, such that this re-synchronization does not ensue according to the existing PNNI protocol.

With reference to FIG. 2, the known neighbouring peer Finite State Machine 5 is used in the existing PNNI Specification to describe the status of database synchronization and flooding which is ongoing between a given node and each of its adjacent neighbouring peers. As known, the specified Finite State Machine 5 for neighbouring peers has an Initial State 12 (labelled "NPDown") which would indicate that there are no active links to the particular neighbouring peer. The first step to creating an adjacency with a neighbouring peer is the Negotiating State 14, known to those skilled in this art. The triggering event to transition to the Negotiating State 14 from the Initial State 12 is termed an Add Port event 13. Here, a Hello state machine for a link to the neighbouring peer has typically reached its 2-WayInside state, as known to those conversant with this art. In the Negotiating State 14, two neighbouring peers will decide which of the nodes is to be the Master for the purpose of database exchange; and an initial DS sequence number is selected. Those skilled in this art will understand that the DS sequence number is used to identify individual Database Summary packets.

Once the Negotiating State 14 is completed, the neighbouring peer nodes will receive Database Summary packets from the node in question during the Exchanging State 16. Thus, the Negotiation Done event 15 will transition the Finite State Machine 5 to the Exchanging State 16. As already known in the PNNI protocol, in the Exchanging Stare 16 the node in question describes its topology database to the neighbouring node. Once the neighbouring node has proceed the Database Summary packets, it can then proceed to request it required PTSE information. If such information is required, the Exchange Done event 17 will transition the Finite State Machine 5 to the Loading State 18.

During the Loading State 18, required PTSE information is requested by the neighbouring node and at least one PTSE header has not yet been received by that node. Lastly in the known PNNI protocol, the Full State 20 is achieved upon either of two events occurring. First, the Full State 20 is arrived at once the receipt of PTSE information is completed following the Loading State 18 by way of the Loading Done event 21. Alternatively, the Full State 20 may be reached directly following the Exchanging State 16 by way of the Synch Done event 19, if the processing of Database Summary packets reveals that no PTSE information is required by the neighbouring node. In the Full State 20, all PTSE information known to be available from the neighbouring peer is possessed by the node in question and links to the neighbouring peer can thereafter be advertised by way of PTSEs.

As mentioned above and with particular reference to FIG. 3, new states are added by way of one embodiment of the present invention to the known Finite State Machine 5 to achieve the modified Finite State Machine 10. These include the Exchange in Full State 22 and the Loading In Full State 24. Where a node in the Full State 20 has already synchronized its topology database prior to a failure or prior to some other requirement for further synchronization, and the node thereafter requires a database re-synchronization, it sends initialized Database Summary packets to its neighbouring peer nodes. As alluded to above, these Database Summary packets will have their respective Sync in Full (SF) Bits set. The Negotiation (in Full) Done event 28 then transitions the Finite State Machine 10 to the Exchange in Full State 22. In the Exchange In Full State 22, a node will attempt to describe its topology database to its neighbour nodes without withdrawing its advertisements of local state information to the neighbours that were advertised when reaching the Full State 20. Similarly, the neighbour nodes with which the node in question is synchronizing will also not withdraw advertisement of their respective local state information to the node requesting a database re-synchronization. Database Summary packets will be sent to the neighbouring peers of a node requesting resynchronization. These Database Summary packets will also have their respective Sync in Full (SF) Bits set. If, as a result of processing Database Summary packets, the failed node determines that no PTSE packets are required, then the Finite State Machine 10 transitions to the Full State 20 by means of the (Re)Sync Done event 25.

On the other hand, if PTSE packets are required, the Finite State Machine 10 executes the Exchange (in Full) Done event 26 in order to transition to the Loading in Full State 24. The required PTSEs will then be requested by the node requiring re-synchronization with links to the neighbouring peer nodes being still advertised as in the Full State 20. Once all requested PTSE packets have been received by the node requesting resynchronization, the Loading (in Full) Done event 27 will transition the Finite State Machine 10 to the Full State 20. Thus, the node requesting resynchronization will send and receive Database Summary, PTSE Request and PTSP packets while its peer data structure is in the Full State 20, Exchange in Full State 22 and Loading in Full State 24. The same state transitions described above will also occur in relation to the neighbouring peer nodes of the failed node which is requesting synchronization.

As such, according to the present invention, two database synchronization procedures are provided, one which operates when the peer data structure is in the Full State 20 and the other which operates when the peer data structure is in the Negotiating State 14. Links between lowest-level neighbouring peers may only be advertised in PTSEs when the neighbouring peer Finite State Machine 10 is in the Full State 20, Exchange in Full State 22 or Loading in Full State 24. Thus, for neighbouring lowest-level peers connected by physical links or VPCs, changes into the Full State 20 from states other than the Exchange in Full State 22 or Loading in Full State 24 and changes out of the grouping of states consisting of the Full State 20, Exchange in Full State 22 and Loading in Full State 24 will cause new instances of one or more PTSEs for a synchronizing node or for a resynchronizing node to be originated or flushed.

In addition to the state transitions which are illustrated in FIG. 2, the known PNNI protocol has four additional events. These are termed the DSMismatch, BadPTSERequest, DropPort and DropPortLast events. Each of the DSMismatch and BadPTSERequest events forces a state transition to the Negotiating State 14. The DSMismatch will occur whenever a Database Summary packet has been received with any one of the following occurring: (i) it has an unexpected DS sequence number, (ii) it has its Initialize Bit unexpectedly set, or (iii) it has an unexpected setting of its Master Bit. According to the present invention, the known DSMismatch event is modified so that the event will also occur whenever a Database Summary Packet has an unexpected setting of the Sync in Full Bit. As well, according to the present invention, a DSMismatch event will also occur when the DS Resynch Inactivity Timer, previously mentioned, expires. Any of the foregoing conditions indicates that an error has occurred in the database synchronization process. The known DropPort event causes no state change, and the known DropPortLast event forces the NPDown State 12. In the known DropPort event, a Hello state machine for a link to the neighbouring peer will have exited the 2-WayInside state. In the known DropPortLast event, it is determined that all ports to the neighbour node have been dropped.

As introduced above, an event which may be termed the DS (Resynch) Mismatch event is defined to take place whenever a Database Summary packet is received with its Synch in Full Bit set and such a packet has its Initialize Bit unexpectedly set. As was the case for the discussion of the DSMismatch event in the known PNNI protocol, the occurrence of the DS Resynch Mismatch event analogously signifies that an error has taken place in the process of database re-synchronization. The DS Resynch Mismatch will indicate that database re-synchronization will be re-attempted without the Finite State Machine 10 dropping to the Negotiating State 14.

The neighbouring peer Finite State Machine 10 according to one embodiment of the present invention will next be discussed in greater detail with reference to Table 1, set out below. In Table 1, the new Exchange in Full State 22 and Loading in Full State 24 are displayed along with potential transition events for these states in summarized form, both existing in the known PNNI protocol and as newly added or modified by way of the present invention. Every cell in the table represents a pairing of a transition event and the indicated state as the current state of the node at the onset of the specified transition event. Each cell reflects the new state achieved as a result of the specified transition event together with an action to be taken by the node in question. Table 1 only displays those aspects of the existing neighbouring peer Finite State Machine 5 of the PNNI protocol which are modified by the present invention or which are supplemented by additional functions or procedures for implementing the present invention, so as to arrive at the modified Finite State Machine 10. These modifications and additions to the existing PNNI protocol are discussed in further detail below.

TABLE 1

Modifications to the Existing PNNI Neigbouring Peer Finite State Machine

| Transition Events | States | | | | | | |
|---|---|---|---|---|---|---|---|
| | NPDown | Negotiating | Exchanging | Loading | Full | Exchange in Full | Loading in Full |
| Add Port | Ds1 Negotiating | — | — | — | — | Ds8 Exchange in Full | Ds8 Loading in Full |
| Negotiation Done | — | — | — | — | — | FSM_ERR | FSM_ERR |
| Negotiation (in Full) Done | FSM_ERR | FSM_ERR | FSM_ERR | FSM_ERR | Ds11 Exchange in Full | FSM_ERR | FSM_ERR |
| Exchange Done | — | — | — | — | — | FSM_ERR | FSM_ERR |
| Exchange (in Full) Done | FSM_ERR | FSM_ERR | FSM_ERR | FSM_ERR | FSM_ERR | Ds3 Loading in Full | FSM_ERR |
| Sync Done | — | — | — | — | — | FSM_ERR | FSM_ERR |
| (Re)Synch Done | FSM_ERR | FSM_ERR | FSM_ERR | FSM_ERR | FSM_ERR | Ds12 Full | FSM_ERR |
| Loading Done | — | — | — | — | — | FSM_ERR | FSM_ERR |
| Loading (in Full) Done | FSM_ERR | FSM_ERR | FSM_ERR | FSM_ERR | FSM_ERR | FSM_ERR | Ds12 Full |
| DS Mismatch | — | — | Ds5 Negotiating | Ds5 Negotiating | — | Ds6 Negotiating | Ds6 Negotiating |
| DS (Resync) Mismatch | FSM_ERR | FSM_ERR | FSM_ERR | FSM_ERR | FSM_ERR | Ds13 Full | Ds13 Full |
| BadPTSE Request | — | — | Ds5 Negotiating | Ds5 Negotiating | — | Ds6 Negotiating | Ds6 Negotiating |
| DropPort | — | — | — | — | — | Ds9 Exchange in Full | Ds9 Loading in Full |
| DropPort Last | — | Ds10 NPDown | Ds10 NPDown | Ds10 NPDown | Ds10 NPDown | Ds10 NPDown | Ds10 NPDown |

As in the existing PNNI Specification, at Section 5.7.4 thereof, FSM_ERR denotes an internal implementation error. Thus, the event Negotiation (in Full) Done 28 should not normally occur while the Finite State Machine 10 is any state except for the Full State 20. Likewise, the events Exchange (in Full) Done 26 and (Re)Sync Done 25 should not occur during any states other than the Exchange in Full State 22. As well, the Loading (in Full) Done event 27 is not expected to occur in any of the states except for the Loading in Full State 24. Moreover, the DS (Resync) Mismatch event is not expected to occur in any of the states except for the Exchange in Full State 22 and the Loading in Full State 24.

Each of the existing events Negotiation Done 15, Exchange Done 17, Sync Done 19 and Loading Done 21 are not provisioned to occur in the new states Exchange in Full 22 and Loading in Full 24 of the present invention. For this reason, the protocol error condition FSM_ERR is reflected under Table 1 for the mapping of the said existing events to the said new states. The existing events are replaced by the analogous events Negotiation (in Full) Done 28, Exchange (in Full) Done 26, (Re)Sync Done 25 and Loading (in Full) Done 27, as explained more fully below.

Where the event AddPort takes place while the node in question is in its NPDown State 12, the known procedures described in the PNNI protocol for the action termed Ds1 in Section 5.7.4 of the PNNI Specification are followed. Generally, the procedures call for the sending of Database Summary packets with no PTSE summaries. These Database Summary packets are retransmitted at the time interval specified by the known DS Rxmt Timer of the neighbouring peer data structure. The difference with the Ds1 procedures of the present invention is that the Database Summary packet will contain an additional bit in the form of the Sync in Full Bit previously mentioned. In the Ds1 procedures referred to in Table 1, the Sync in Full Bits of the Database Summary packets in question are not set. Where an AddPort event takes place during the Exchange in Full State 22 or during the Loading in Full State 24, the state machine will remain in the same state. In the case of lowest-level neighbouring peers connected by physical links or VPCs, the port ID is added to the Port ID list of the neighbouring peer data structure. As well, a link to the neighbouring peer will be added and a new instance of a PTSE will be originated. This set of actions is the sane as specified in the PNNI protocol as it exists and is denoted as action Ds8 in Section 5.7.4 of the PNNI Specification.

If the Finite State Machine 10 is in its Full State 20 and the event Negotiation (in Full) Done 28 takes place, a transition to the Exchange in Full State 22 is triggered and the set of actions denoted as Ds11 in Table 1 will take place. Under this set of actions termed Ds11, and as is the case with the actions termed Ds2 in the known PNNI protocol, the node in question will begin sending a summary of the contents of its topology database to the neighbouring peer in the form of Database Summary packets. The procedures followed upon this transition to the Exchange in Full State 22 are identical to those denoted as Ds2 in Section 5.7.4 of the PNNI Specification, with the exception that the Database Summary packets sent by the node will have the Sync in Full Bit set. As well, according to the present invention, the Resynch Inactivity Timer will be started as part of the Ds2 procedures upon the state transition if this timer is not already running.

Where an Exchange (in Full) Done 26 event is injected during the Exchange in Full State 22 of the Finite State Machine 10, a transition to the Loading in Full State 24 will take place. The Ds3 action as described in Section 5.7.4 of the existing PNNI Specification thereafter ensues. Namely, the DS Rxmt Timer will be stopped if not previously stopped. PTSE Request packets will be sent or will continue to be sent to the neighbouring peer in question or to other neighbouring peers, as known to those in this art. Each of the PTSE Request packets will request some of the neighbouring peer's more recent PTSEs which were previously discovered but have not yet been received. These PTSEs will be listed in the PTSE Request list in the neighbouring peer data structure.

Whenever a (Re) Sync Done event 25 is injected while the state machine resides in its Exchange in Full State 22, the Finite State Machine 10 will transition to the Full State 20. This event associated with the Exchange in Full State 22 is termed the (Re) Sync Done event 25 to distinguish the event from its counterpart taking place during the Exchanging State 16.

Whenever a Loading (in Full) Done event 27 is injected while the Finite State Machine 10 resides in its Loading in Full State 24, the state machine will transition to the Full State 20. This event associated with the Loading in Full State 24 is termed the Loading (in Full) Done event in FIG. 3 to distinguish the event from its counterpart taking place during the Loading State 18.

In the situation of a Loading (in Full) Done event 27 taking place during the Loading in Full State 24 or in the situation of a (Re) Sync Done event 25 taking place during the Exchange in Full State 22, the DS Rxmt timer and the Resynch Inactivity Timer introduced in the illustrative embodiment of the present invention and mentioned above will be stopped. These actions following the state changes in question are termed Ds12 in Table 1. This signifies that database re-synchronization is completed.

Where either a DSMismatch event or a BadPTSERequest event is injected during either of the Exchanging State 16 or the Loading State 18, a state transition to the Negotiating State 14 is effected. As well, the known procedures denoted Ds5 in the existing PNNI protocol are initiated following the state transition in question. These procedures are described in Section 5.7.4 of the PNNI Specification. According to the present invention, however, the Resynch Inactivity Timer will also be stopped if not previously stopped, as is the case with the Peer Delayed Ack Timer, DS Rxmt Timer and Request Rxmt Timer of the known protocol. According to the present invention, the Sync in Full Bit of the Database Summary packets sent by the node in the known Ds5 procedures will not be set.

The events DS Mismatch and BadPTSERequest of Table 1 which occur during either of the Exchange in Full State 22 or the Loading in Full State 24 will cause a transition to the Negotiating State 14. The actions to be taken will be as specified above in the case of the same event which occurs during either of the Exchanging or Loading states, with the exception that PTSEs will be modified to remove any advertising of links to the neighbour. The latter step is known in the existing PNNI protocol, and is described as action Ds6 in Section 5.7.4 of the PNNI Specification.

The Finite State Machine 10 is executed with the event DS Mismatch whenever the Resynch Inactivity Timer expires. This forces the node to withdraw all links to the non-responsive neighbour which are currently being advertised in PTSEs. The Finite State Machine 10 is then forced to the Negotiating State 14 where the node will once again attempt to synchronize databases in the known manner starting from the Negotiating State 14. In the event of a successful database re-synchronization, the Resynch Inactivity Timer is stopped.

Still with reference to Table 1, when a DS (Re Sync) Mismatch occurs during the Exchange in Full State 22 or the Loading in Full State 24, the Full State 20 is reverted to. The action taken upon this transition event will result in the Peer Delayed Ack Timer, DS Rxmt Timer and Request Rxmt Timer being stopped if not previously stopped. All of the said timers are known in the existing PNNI protocol. The Peer Retransmission List, Peer Delayed Acks List, PTSE Request List and all related timers are also cleared. The exchange of database summaries with the Sync in Full Bit set must start over again. Then, the node in question increments the DS sequence number for this neighbouring peer, declares itself master by setting the Master Bit to a value of one, and will start sending Database Summary packets with the Initialize, More, Master and Sync in Full Bits set. No PTSE summaries are included with these packets. Lastly, the DS Rxmt Timer is started and the Database Summary packet is retransmitted each DSRxmtInterval time, if no DB Summary packet is received to acknowledge it. All of these actions upon the state change to the Full State 20 have been termed Ds13 in Table 1.

The DropPort event of Table 1 will result in the Finite State Machine 10 retaining the Exchange in Full State 22 and the Loading in Full State 24, wherever the Finite State Machine 10 is respectively in those same states. As with the Ds9 procedures of Section 5.7.4 of the existing PNNI protocol, the link in question is removed from the Port ID list in the corresponding neighbouring peer data structure. If there is a PTSE advertising that link, a new instance of the affected PTSE will be originated. If the link is the last active link to the neighbour, the DropPortLast event will be generated. As shown in Table 1, the DropPortLast event will transition the Finite State Machine 10 to the NPDown State 12 whenever the Finite State Machine 10 is in either of the Exchange in Full State 22 or the Loading in Full State 24. As known in the PNNI protocol and termed Ds10 in Section 5.7.4 of the PNNI Specification, the Peer Delayed Ack Timer, DS Rxmt Timer and Request Rxmt Timer are stopped if not previously stopped. As known in the existing Ds10 procedure, the Peer Transmission List, Peer Delayed Acks List and PTSE Request List are cleared together with their related timers. However, according to the present invention, the Resynch Inactivity Timer will also be stopped, if not previously stopped.

Sending Database Summary Packets

The sending of Database Summary packets is generally as specified by the known PNNI protocol, with the exceptions noted below. However, in the Full State 20, a node may initiate a database resynchronization by sending empty Database Summary packets with the Initialize, More, Master and Synch in Full Bits set. The Resynch Inactivity Timer is started when the first such Database Summary packet is sent, if this timer is not already running. When sending such Database Summary packets, the DS Rxmt Timer must be restarted. These packets are retransmitted by the node initiating a database resynchronization every DS Rxmt Interval seconds, when the DS Rxmt Timer fires.

A node in its Full State 20 will also send Database Summary packets in response to received Database Summary packets with the Initialize, More, Master, and Sync in Full Bits set from a neighbouring peer that is requesting a database re-synchronization. When the node initiates a database re-synchronization, it sends Database Summary packets with the Synch In Full, Initialize, More and Master Bits set to a value of one. A node that responds to a neighbour node requesting a database re-synchronization will set the Synch in Full, Initialize, More and Master Bits, as described more fully below. When a node responds to the first such Database Summary packet to a neighbour peer requesting a database re-synchronization, it starts the Resynch Inactivity Timer, if it is not already running.

In the Negotiating State 14, the node in question will send empty Database Summary packets as in the existing protocol, with the exception that the Sync in Full Bit will not be set in the Database Summary packet which has been modified according to the present invention to include an additional bit in the form of the said Sync in Full Bit. In the Exchange in Full State 22, the node in question will send Database Summary packets identical to those in the known Exchanging State 16, but the Sync in Full Bit will be set in such Database Summary packets.

Receiving Database Summary Packets

The processing of a received Database Summary packet by a node is next explained. The receiving of Database Summary Packets is generally as specified by the known PNNI protocol, with the exceptions noted below. If a Database Summary packet is accepted, a number of packet fields are saved in the corresponding neighbouring peer data structure in the known record identified as the Last Received Database Summary Packet's Identifying Information. Thus the packet flags consisting of the Initialize, More, Master and Reserved bits are saved in this manner, together with the DS sequence number, all as known in the existing PNNI protocol. However, the Sync in Full Bit of the present invention is also saved together with the foregoing bits. Where these saved items are set identically in two consecutive Database Summary packets received from a neighbouring peer, the second such Database Summary packet will be deemed a duplicate in the processing of received Database Summary packets.

As in the known PNNI protocol, a Database Summary Packet must be ignored if the packet is received when the Finite State Machine 10 is in the NPDown State 12.

In the existing PNNI Specification, a Database Summary Packet which is received when the Finite State Machine 5 is in the Negotiating State 14 and which matches one of the two cases specified in Section 5.7.6 of the existing PNNI Specification under the heading "Negotiating", will execute the Finite State Machine 5 with the event Negotiation Done and with a transition to the Exchanging State 16. In the first of these cases of the known protocol, the Initialize, More and Master Bits are set to a value of one. In the present invention, in addition to the Initialize, More and Master Bits having the foregoing values, the Sync in Full Bit must be set to a value of zero for a packet to be accepted as next in sequence and processed further in the manner already known according to the first case discussed under the heading "Negotiating" of Section 5.7.6. In the second of these cases of the known protocol, the Initialize and Master Bits are set to a value of zero. In the present invention, in addition to the Initialize and Master Bits having the foregoing values, the Sync in Full Bit must be set to a value of zero for a packet to be accepted as next in sequence and processed further in the manner already known according to the second case discussed under the heading "Negotiating" of Section 5.7.6.

For a Database Summary packet which is received when the Finite State Machine 10 is in the Exchanging State 16, the procedures set out in the existing PNNI Specification under the heading "Exchanging" of Section 5.7.6 are followed, with one exception. Namely, a new condition is inserted immediately following the third existing step enumerated under the said heading of Section 5.7.6. This new condition requires that if the Sync in Full Bit is set, the event DS Mismatch will be generated and processing of the Database Summary Packet will be stopped. The procedures to be followed for receipt of a Database Summary packet in the Exchanging State 16 are otherwise as described in the existing PNNI Specification.

The receiving of Database Summary packets when the node is in its Loading State 18 signifies that the node has sent and received an entire sequence of Database Summary packets. Thus, the only packets so received should be duplicates. Any other Database Summary packets received must generate the event DS Mismatch, causing a reversion to the Negotiating State 14 with the two peers synchronizing their databases again according to the known PNNI protocol. The procedure followed when receiving a Database Summary packet in the Loading State 18 is therefore as specified in Section 5.7.6 of the existing PNNI protocol.

Where the node is in the Full State 20 and the received Database Summary packet has its Sync in Full Bit set, then if the received packet matches one of the two cases which follows, the Finite State Machine 10 must be executed with the Negotiation (in Full) Done event 28. The Finite State Machine 10 is thereby caused to transition to the Exchange in Full State 22. The packet is thereafter accepted as next in sequence and is processed further as set out below.

Case 1: Receiving Node is a Slave

This case covers the situation in which the Initialize, More and Master Bits are set to a value of one, the contents of the packet are empty, and the neighbouring peer Node ID is larger than the Node ID associated with the receiving node.

In this situation the node in question is a Slave, and upon generating the Negotiation (in Full) Done event 28, the slave node takes the following sequence of actions. First, the DS Rxmt Timer is stopped. Next, the Resynch Inactivity Timer is started if the timer is not already running. Then, the Master Bit is set to a value of zero (indicating the given node is a Slave), the Initialize Bit is also set to a value of zero, the Sync in Full Bit is set to a value of one, the DS sequence number is set to that specified by the Master node, and a Database Summary packet is sent to the Master including that portion of the database summary information for the node in question as set out in Section 5.7.5 of the existing PNNI specification.

Case 2: Receiving Node is a Master

This case covers the situation in which the Initialize and Master Bits are set to a value of zero, the DS sequence number of the packet is equal to the DS sequence number of the node in question (indicating an acknowledgement), and the Node ID of the neighbouring peer is smaller than that of the given node.

In this case the node in question is a Master node. Upon generating the Negotiation (in Full) Done event 28, the Master node must take the following sequence of actions. First, the DS Rxmt Timer must be stopped. Then, the contents of the received Database Summary packet must be acknowledged as having been received and these contents are thereafter processed in the manner known in the existing PNNI protocol, as explained on pages 94 and 95 in Section 5.7.6 of the PNNI Specification under the heading "Exchanging State". The DS sequence number must be incremented by a value of one, the Sync in Full Bit is set to a value of one, and the Initialize Bit must be set to a value of zero. The Database Summary packet must be sent to the Slave node including that portion of the database summary information for the node in question as set out in Section 5.7.5 of the existing PNNI Specification, and the DS Rxmt Timer must be restarted. The Resynch Inactivity Timer is started if it is not already running.

If neither of Cases 1 or 2 above are applicable, the packet in question is verified as to whether it is a duplicate. If the packet is a duplicate, it is ignored. Otherwise, if the packet is not a duplicate then an error has occurred during re-synchronization and the Finite State Machine 10 must thereafter be executed with the event DS Mismatch.

If a node is in the Full State 20 and the received Database Summary packet does not have its Sync in Full Bit set, then the packet in question is expected to be a duplicate. Any other Database Summary packet with the Sync in Full Bit not being set will generate the event DS Mismatch, thereby causing the Finite State Machine 10 to revert to the Negotiating State 14 and the two neighbouring peers in question to re-synchronize their databases. According to the present invention, the procedures followed when receiving a Database Summary packet with the Sync in Full Bit not being set are the same as those followed in the known Exchanging State 16, except that packets accepted as the next in sequence must generate the event DS Mismatch and that further processing of such packets is stopped. The receipt of packets with an inconsistent Master Bit or with the Initialize Bit set to a value of one must also generate the event DS Mismatch.

Where the state of the node is the Exchange in Full State 22, a received Database Summary packet will be processed according to the present invention by executing the following conditional steps. Where any one of these conditional steps has tested true, none of the remaining steps need be tested or executed.

1) If a Database Summary packet is received by the node acting as a Master, processing of the packet will be stopped if the packet is determined to be a duplicate. The determination of a duplicate packet was discussed previously.

2) If on the other hand the node is acting as a Slave, the response to the receipt of a duplicate packet is to retransmit the last Database Summary packet sent to the Master and then to stop processing the received Database Summary packet.

3) If the packet is not a duplicate in any event and the state of the Master Bit is inconsistent with the Master/Slave state of the connection, the event DS Mismatch is generated and the processing of the packet is stopped.

4) Where the Master Bit is consistent but the Sync in Full bit is not set, the event DS Mismatch will be generated and processing of the packet will be stopped.

5) Where all of the previously enumerated conditions have tested false and the Initialize Bit is set, the event DS Resynch Mismatch will be generated and processing of the packet will be arrested.

6) Where all of the previously enumerated conditions have tested false and the node is a Master, then the packet is accepted and further processed where the DS sequence number of the packet equals the DS sequence number for the node. This signifies that the packet is the next in sequence. The processing in this case is performed in the following manner.

The DS Rxmt Timer is stopped. Following this, the contents of the most recently received Database Summary packet are acknowledged as having been received and the contents thereof are then processed in the manner known in the existing PNNI protocol, as explained on pages 94 and 95 in Section 5.7.6 of the PNNI Specification under the heading "Exchanging". The DS sequence number is then incremented by a value of one. Next, if the node has already sent its entire sequence of Database Summary packets and the received packet has its More Bit set to a value of zero, the event (Re)Synch Done 25 is generated if the PTSE Request List is empty and the event Exchange (in Full) Done 26 is generated if the PTSE Request List is not empty. The determination of whether a node has sent its entire sequence of Database Summary packets is made if the previous Database Summary packet sent by the node also had its More Bit set to a value of zero. If the entire sequence of Database Summary packets is not yet received, a new Database Summary packet is sent to the Slave and the DS Rxmt Timer is restarted.

7) Where all of the previously enumerated conditions have tested false and the node is a Slave, then the packet is accepted and further processed where the DS sequence number of the packet is one more than the DS sequence number of the node. This signifies that the packet is the next in sequence. The processing of the packet in this situation is according to the two-step procedure as follows:

As a first step, the contents of the Database Summary packet which are acknowledged as having been received are then processed in the manner known in the existing PNNI protocol, as explained on pages 94 and 95 in Section 5.7.6 of the PNNI Specification under the heading "Exchanging". As a second step, the following actions are performed. The DS sequence number is set to the DS sequence number appearing in the received packet. Then, a Database Summary packet is sent to the Master. Next, if the received packet has its More Bit set to zero, and the just transmitted Database Summary packet is empty and thus it also has its More bit set to zero, then the event (Re)Synch Done 25 is generated if the PTSE Request List is empty. If the PTSE Request List is not empty, the event Exchange (in Full) Done 26 is executed.

8) Where all of the previously enumerated conditions have tested false, the event DS Match is generated and processing of the Database Summary packet is stopped.

With regard to the Loading in Full State 24, a node in this state will have sent and received an entire sequence of Database Summary packets with the Sync in Full Bit set.

Thus, the only Database Summary packets received by the node in this state should be duplicates. Any other Database Summary packets received that are not requesting a re-synchronization must generate the event DS Mismatch. This causes a reversion to the Negotiating State 14 and the two neighbouring peers in question will then proceed to synchronize their databases according to known procedures. The procedures to be followed when receiving a Database Summary packet in the Loading in Full State 24 are the same as those followed in the Exchange in Full State 22, except that packets accepted as the next in sequence must generate the event DS Mismatch instead, and further processing of such packets is stopped. Receipt of packets with an inconsistent Master Bit will also generate the event DS Mismatch. Any packets with the Initialize Bit as the only inconsistent bit will generate the event DS Resynch Mismatch.

As previously mentioned, an additional flag is defined according to the present invention for the otherwise known Database Summary packet of the existing PNNI protocol.

For instance, bit number 13 in the known Flags field of the Database Summary packet may be used to define this new flag, which for convenience may be termed the Synch in Full (SF) Bit. This bit is set to a value of one by each of two nodes that will perform a database re-synchronization to distinguish this exchange process from synchronization as known in the existing PNNI protocol.

Those skilled in this art will appreciate that in some instances, networks having topology state routing protocols may be associated with other protocols which are prerequisite to the procedures of database synchronization. For instance, in the specific case of the existing PNNI protocol, it must be ensured in applying the present invention that the Hello protocol is not disrupted by reason of the activity switch from the active routing entity to the inactive routing entity. If this were not the case, the network node associated with the failed active routing entity would be declared unreachable solely by reason of the activity switch. Thus, in the case of network protocols such as the PNNI protocol, local state information associated with the active routing entity must be provided to the inactive routing entity such that each will share a common understanding of local status information during recovery from failure. This may be accomplished, for instance, by periodic transmission of local state information from the active routing entity to the inactive routing entity prior to the failure in question.

Figure 4:
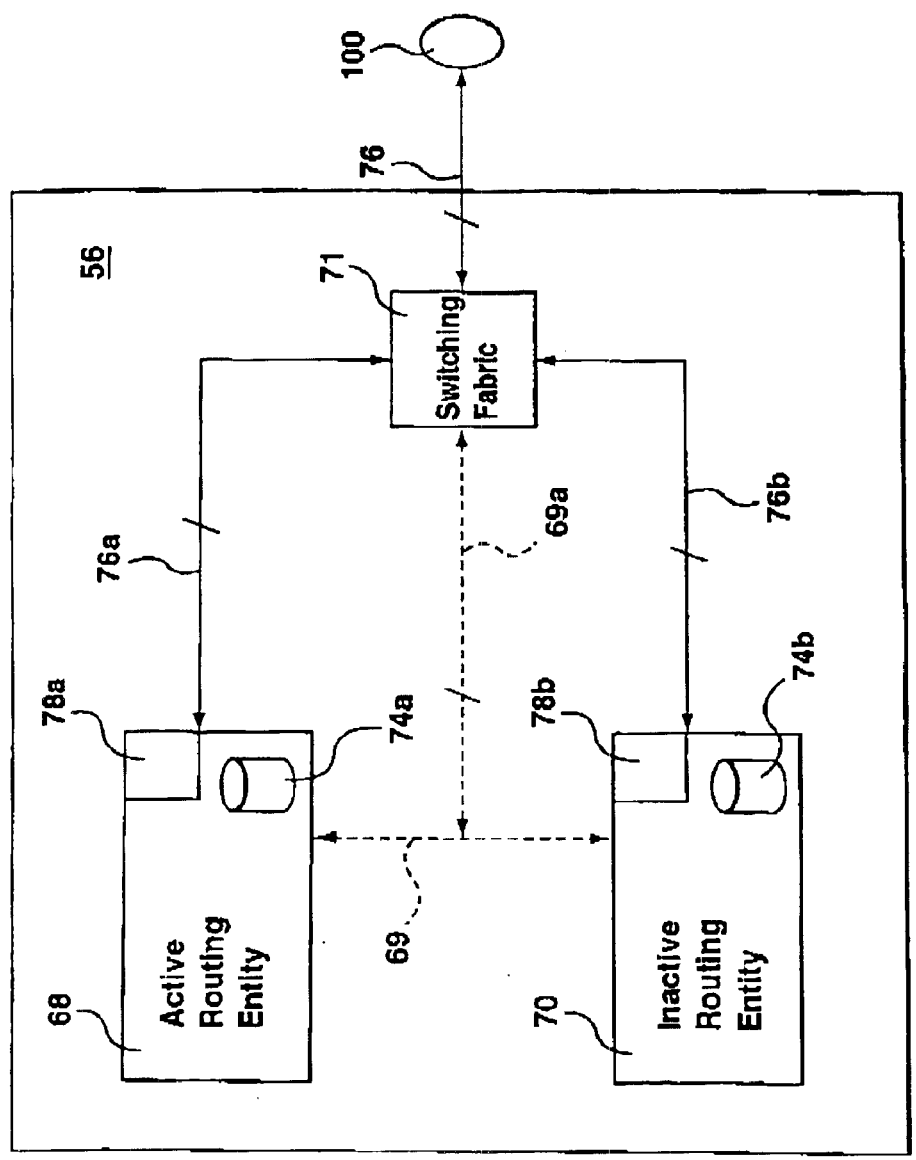
FIG. 4 is a block diagram of a hot redundant network element in which the method of the present invention may be implemented.

The invention will next be described with reference to FIG. 4 in relation to a hot redundant network element 56 in a communications network such as a network 2 (FIG. 1) comprising network domains 30 and 55. The network element 56 may also implement a Logical Group Node, such as the node 36. The network element 56 comprises an input/output port 100, through which network connections 76 are routed by means of switching fabric 71. Network connections 76a may be re-routed or diverted as at 76b from an active routing entity 68 to an inactive routing entity 70 upon a failure of the active routing entity 68. Both the active routing entity 68 and the inactive routing entity 70 are provided with access to topology state information concerning the communications network 2 having network domains 30 and 55. For instance, the topology state information in question may be accessible to the active routing entity 68 and the inactive routing entity 70 by way of respective topology databases 74a and 74b.

According to the present invention, both the active routing entity 68 and the inactive routing entity 70 of a hot redundant network element such as node 56 may share topology state information with each other by way of periodic transmissions 69 of topology state information from the active routing entity 68 to the inactive routing entity 70 which take place at predetermined intervals prior to the occurrence of a failure affecting the active routing entity 68. Alternatively, such transmissions may occur as new data is received by the active routing entity 68 in an event driven manner. As well, the inactive routing entity 70 may instead periodically be updated with topology state information supplied externally of node 56, for instance via externally sourced transmissions 69a. Those skilled in this art will appreciate that it is also possible to adapt the method of the present invention for use with a node 56 having an inactive routing entity 70 which is not periodically updated with topology state information. Those versed in this art will also understand that the sharing of topology information between the active and inactive routing entities 68, 70 of network element 56, as well as any other mechanism for periodically updating the topology state information of the inactive routing entity 70, may be conducted according to known techniques.

As is known in the art of hot redundancy techniques, not only may it be desired to update periodically the topology state information of the inactive routing entity 70, but in like manner, local state information may also be periodically transmitted to the inactive routing entity 70. For example, in the PNNI protocol, such local state information is transmitted by means of the Hello protocol. As previously explained, this is to prevent that network nodes do not declare a failed node unreachable for purposes of routing solely by reason of the activity switch which created the need for a database resynchronization. The recovered node will therefore retain its local state information following the activity switch in question. Such local state information would be transmitted in an analogous manner to that previously described in relation to topology state information.

When a node 56 (and logical node 36 which it implements) has previously synchronized topology databases with its neighbouring peers and would like to re-synchronize these databases, whether to recover from a failure local to the active routing entity 68 or to perform a reset thereof, the implementation of the present invention will permit the node to initiate a topology database exchange process with its neighbour nodes which does not result in termination of the advertisement of local state information as it pertains to the node associated with the failure of the active routing entity 68 and as it pertains to each node which is immediately adjacent to the node associated with the failure of active routing entity 68. Such immediately adjacent nodes, as the terminology is used herein, include both physical and logical neighbour nodes. For instance, in the PNNI protocol, link advertisements among the various nodes involved in recovery from the failure of active routing entity 68 will not be terminated during database exchange. Thus, according to the present invention, the node associated with the failure of active routing entity 68 will not withdraw the advertisement of its local state information. As well, according to the present invention, the neighbour nodes which are immediately adjacent the node associated with the failure of active routing entity 68 likewise will not withdraw advertisement of the respective local state information pertaining to each such neighbour node.

The method of the present invention as described above may be implemented in each of the active routing entity 68 and the inactive routing entity 70 by respective database synchronization processors 78a and 78b, which may be realized in hardware, software or a combination thereof. Synchronization processors 78a and 78b perform the various procedures previously described in relation to the exchange of topology state information between the node 56, each of its immediately adjacent lower-level neighbours 57, 59, 60 and between node 36 and each of its immediately adjacent higher-level logical neighbours 34, 35, 37, 38. Although what has been described above provisions a respective synchronization processor 78a or 78b with each of the active routing entity 68 and the inactive routing entity 70, those skilled in this art will appreciate that a single synchronization processor may also be shared by both of the devices.

Thus, the present invention defines a database re-synchronization mechanism between a node and immediately adjacent physical or logical neighbour nodes thereto which causes these nodes not to alter their advertisements of local state information during the synchronization process. This should ensure that the synchronization between the nodes in question will be transparent to all other nodes in the network, namely those nodes which are not the immediately adjacent physical or logical neighbouring nodes of the failed node. The latter neighbouring nodes are the only nodes which need be called upon to take part in re-synchronization.

According to the present invention, an attempt is therefore made to address certain of the shortcomings of known prior art systems for database resynchronization, as may occur during hot redundancy recovery. In cases where the failed node is an active routing entity possessing distinguished responsibilities, the failure of the active routing entity is not as disruptive of the routing system or the network in general in the sense that none of the distinguished responsibilities of the routing entity need be relinquished during recovery. Hence, no other node need assume the distinguished responsibilities of the failed node. For instance, the Backup Designated Router of the OSPF protocol would not become the Designated Router and a new Peer Group Leader would not be elected at any level of the network hierarchy under the PNNI protocol as replacements for a failed distinguished network component.

Since fault detection and fault recovery in the present invention occur within the failed node and only with respect to physical or logical immediately contiguous nodes or devices, the recovery process according to the present invention is expected to be less time intensive than that of prior art techniques for hot redundancy recovery. As well, given that there is expected to be no involvement of network devices other than those described above which are contiguous to the failed network entity, a less extensive portion of the network topology participates in recovery than would be the case with the prior art techniques or devices. This expected advantage in the time and topological extent of recovery is applicable whether or not the failed node is normally performing distinguished responsibilities. Lastly, network bandwidth and processing requirements associated with the recovery process of the present invention are expected to be reduced over known techniques of fault recovery in that only those nodes which immediately neighbour a failed component are involved in the recovery.

Although the present invention has been described with reference to an implementation adapted to the existing PNNI protocol, those skilled in the art of communications networks will appreciate that the invention may be applied or adapted to other topology state protocols. As well, while a synchronization processor may be employed for executing the method of the present invention, the various steps of the method may be performed in whole or in part by one or more other devices or software associated with a network element, or may be performed by existing devices or software which are associated therewith and which may be modified or otherwise adapted for use with this invention. Further, although the present invention has been described in the context of hot redundancy recovery, the invention may be employed in other situations of failure recovery or whenever it may be desirable for a node to resynchronize its topology database once it has previously performed a database synchronization. Moreover, those skilled in this art will understand that various modifications of detail may be made to the present invention, all of which come within its spirit and scope.

What is claimed is:

1. A method for recovery from a failure which affects an active routing entity in a communications network, the active routing entity being associated with a network node of the communications network, the communications network comprising a routing protocol for intermittent advertisement of local state information throughout the network and further comprising an inactive routing entity to which network connections of the network node can be diverted from the active routing entity upon the said failure, the method comprising the steps of:

(a) upon the failure, executing an activity switch between the active routing entity and the inactive routing entity, wherein network connections of the network node are diverted from the active routing entity to the inactive routing entity to thereby transform the inactive routing entity into a newly active routing entity;

(b) following the activity switch, exchanging topology state information between the newly active routing entity and each immediately adjacent neighbour node of the network node associated with said failure such that the newly active routing entity and every said immediately adjacent neighbour node respectively possess synchronized topology state information; and wherein the exchange of topology slate information between the newly active routing entity and each said immediately adjacent neighbour node is performed without withdrawal, by the network node associated with said failure and by each said immediately adjacent neighbour node, of the said intermittent advertisement of local state information as it pertains respectively to the network node associated with said failure and to each said immediately adjacent neighbour node.

2. The method according to claim 1, further comprising the step of transmitting topology state information to the inactive routing entity prior to the failure, whereby the active routing entity and the inactive routing entity both share a common understanding of overall network topology status immediately following said transmission of topology state information.

3. The method according to claim 2, wherein the transmission of topology state information is periodic.

4. The method according to claim 3, wherein the periodic transmission of topology state information to the inactive routing entity is from the active routing entity.

5. The method according to claim 2, flier comprising the step of transmitting local state information to the inactive routing entity prior to the failure, whereby the active routing entity and the inactive routing entity both share a common understanding of local status immediately following said transmission of local state information.

6. The method according to claim 5, wherein the transmission of local state information is periodic.

7. The method according to claim 6, wherein the periodic transmission of local state information to the inactive routing entity is from the active routing entity.

8. The method according to claim 5, wherein the local state information comprises local link status information and local nodal status information.

9. The method according to claim 8, wherein the local link status information is selected from the group consisting of link characteristics, link operational status and port identifiers.

10. The method according to claim 8, wherein the local nodal status information is selected from the group consisting of node identifier, peer groups identifier, distinguished node election status, distinguished node leadership state and local reachable addresses.

11. The method according to claim 7, wherein the active routing entity and the inactive routing entity each forms part of the network node associated with said failure.

12. The method according to claim 11, wherein the active routing entity and the inactive routing entity are each implemented by way of distinct physical components.

13. The method according to claim 5, wherein the communications network is an Asynchronous Transfer Mode (ATM) network and the routing protocol for intermittent advertisement of local state information throughout the communications network is the PNNI protocol.

14. The method according to claim 5, wherein the communications network is an Internet Protocol (EP) network and the routing protocol for intermittent advertisement of local state information throughout the communications network is the Open Shortest Path First (OSPF) protocol.

15. The method according to claim 13, wherein topology state information transmitted from the active routing entity prior to the failure is extracted from a topology database associated with the active routing entity, and wherein topology state information which is exchanged following the activity switch between the newly active routing entity and every said immediately adjacent neighbour node is extracted from a topology database respectively associated with the newly active routing entity and every said immediately adjacent neighbour node.

16. The method according to claim 15, wherein topology state information is transmitted from the active routing entity to the inactive routing entity prior to the failure by bundling the topology state information into PNNI Topology State Elements (PTSE).

17. The method according to claim 15, wherein topology state intonation is exchanged following the activity switch between the newly active routing entity and every said immediately adjacent neighbour node by bundling the topology state information into PNNI Topology State Elements (PTSE).

18. The method according to claim 16, wherein each PTSE is encapsulated within PNNI Topology State Packets (PTSP) for said transmission.

19. The method according to claim 17, wherein each PTSE is encapsulated within PNNI Topology State Packets (PTSP) for said exchange.

20. The method according to claim 15, wherein the newly active routing entity, prior to the said exchange of topology state information with each said immediately adjacent neighbour node, notifies each said immediately adjacent neighbour node that the said exchange is to take place without said withdrawal of the said intermittent advertisement of local state information.

21. The method according to claim 20, wherein the notifying of the said exchange of topology state information without said withdrawal of the said intermittent advertent of local state information takes place by way of a flag in a notification message sent to each immediately adjacent neighbour node of the network node associated with said failure.

22. The method according to claim 21, wherein the notification message is a PNNI Database Summary packet in which said flag is provisioned.

23. A network element for recovery from a failure in a communications network which includes a routing protocol for intermittent advertisement of local state information throughout the network, the network element comprising:
an active routing entity, wherein the active routing entity is associated with topology state information concerning the communications network;
an inactive routing entity, wherein an activity switch is executed between the active routing entity and the inactive routing entity upon failure of the active routing entity to thereby divert network connections from the active routing entity to the inactive routing entity and transform the inactive routing entity into a newly active routing entity;
a database synchronization processor, wherein the database synchronization processor effects an exchange of topology state information between the newly active routing entity and each immediately adjacent neighbour node of the network element following the activity switch such that the newly active routing entity and every said immediately adjacent neighbour node respectively possess synchronized topology state information, and wherein the said exchange of topology state information between the newly active routing entity and each said immediately adjacent neighbour node is performed without withdrawal, by the network node associated with said failure and by each said immediately adjacent neighbour node, of the said intermittent advertisement of local state information as it pertains respectively to the network element and to each immediately adjacent neighbour node.

24. The network element according to claim 23, wherein the topology state information is transmitted to the inactive routing entity prior to tbe failure of the active routing entity, such that the active routing entity and the inactive routing entity both share a common understanding of overall network topology status following said transmission of topology state information.

25. The network element according to claim 24, wherein the transmission of topology state information is periodic.

26. The network element according to claim 25, wherein the periodic transmission of topology state information to the inactive routing entity is from the active routing entity.

27. The network element according to claim 24, wherein local state information is transmitted to the inactive routing entity prior to the failure of the active routing entity, whereby the active routing entity and the inactive routing entity both share a common understanding of local status immediately following said transmission of local state information.

28. The network element according to claim 27, wherein the transmission of local state intonation is periodic.

29. The network element according to claim 28, wherein the periodic transmission of local state information to the inactive routing entity is from the active routing entity.

30. The network element according to claim 24, wherein the local state information comprises link status information and local nodal status information.

31. The network element according to claim 30, where the local link status information is selected from the group consisting of link characteristics, link operational status and port identifiers.

32. The network element according to claim 31, wherein the local nodal status information is selected from the group consisting of node identifier, peer group identifier, distinguished node election status, distinguished node leadership status and local reachable addresses.

33. The network element according to claim 32, wherein the active routing entity and the inactive routing entity are each implemented by way of distinct physical components.

34. The network element according to claim 26, wherein the communications network is an Asynchronous Transfer Mode (ATM) network and the routing protocol for intermittent advertisement of local stare information throughout the communications network is the PNNI protocol.

35. The network element according to claim 26, wherein the communications network is an Internet Protocol (IP) network and the routing protocol for intermittent advertisement of link status information throughout the communications network is the Open Shortest Path First (OSPF) protocol.

36. The network element according to claim 34, wherein topology state information transmitted from the active routing entity prior to the failure of the active routing entity is extracted from a topology database associated with the active routing entity, and wherein topology state information which is exchanged following the activity switch between the newly active routing entity and every said immediately adjacent neighbour node is extracted from a topology database respectively associated with the newly active routing entity and every said immediately adjacent neighbour node.

37. The network element according to claim 23, wherein topology state information is transmitted from the active routing entity to the inactive routing entity prior to the failure by bundling the topology state information into PNNI Topology State Elements (PTSE).

38. The network element according to claim 23, wherein topology state information is exchanged following the activity switch between the newly active routing entity and every said immediately adjacent neighbour by bundling the topology state information into PNNI Topology State Elements (PTSP).

39. The network element according to claim 37, wherein each PTSE is encapsulated within PNNI Topology State Packets (PTSP) for said transmission.

40. Th network element according to claim 38, wherein each PTSE is encapsulated within PNNI Topology State Packets (PTSP) for said exchange.

41. The network element according to claim 23, wherein the newly active routing entity, prior to the said exchange of topology state information with each said immediately adjacent neighbour node, notifies each said immediately adjacent neighbour node that the said exchange is to take place without said withdrawal of the said intermittent advertisement of local state information.

42. The network element according to claim 41, wherein the notifying of the said exchange of topology state information without said withdrawal of the said intermittent advertisement of local state information takes place by way of a flag in a notification message sent to each immediately adjacent neighbour node of the network element.

43. The network element according to claim 42, wherein the notification message is a PNNI Database Summary packet in which said flag is provisioned.

44. A method for synchronization of topology state information between two network nodes in a communications network, the communications network comprising a routing protocol for intermittent advertisement of local state information throughout the network, the two network nodes comprising a requesting node which initiates a request for topology site synchronization and a replying node which receives said request and which communicates with the requesting node to provide topology state information to the requesting node which is not possessed by the requesting node when same initiates said request, the method comprising the step of selecting prior to said request being made by the requesting node to the replying node, between a first and a second mode of synchronization, the first said mode providing for topology state synchronization which entails withdrawal, by the said requesting node and by the said replying node, of the said intermittent advertisement of local state information as it pertains respectively to the requesting node and to the replying node, and the second said mode providing for topology state synchronization which maintains the said intermittent advertisement of local state information as it pertains respectively to the requesting node and to the replying node.

45. The method according to claim 44, further comprising the step of exchanging topology state information between the requesting node and the replying node once the request for topology state synchronization has been made by the requesting node to the replying node.

46. The method according to claim 45, wherein prior to the said exchange of topology state information, the requesting node notifies the replying node that the said exchange is to take place according to one of the said first mode and the said second mode of synchronization.

47. The method according to claim 46, wherein said notification takes place by way of a flag in a notification message sent by the requesting node to the replying node.

48. The method according to claim 47, wherein the topology state information which is exchanged between the requesting node and the replying node is extracted from topology state databases each respectively associated with the said requesting and replying nodes.

49. The method according to claim 47, wherein the communications network is an Asynchronous Transfer Mode (ATM) network and the routing protocol for intermittent advertisement of local state information throughout the network is the PNNI protocol.

50. The method according to claim 47, wherein the communications network is an Internet Protocol (IP) network and the routine protocol for intermittent advertisement of local state information throughout the network is the Open Shortest Path First (OSPF) protocol.

51. The method according to claim 49, wherein the notification message is a PNNI Database Summary packet in which said flag is provisioned.

52. The method according to claim 51, wherein the topology state information is exchanged by bundling the topology state information into PNNI Topology State Elements (PTSE).

53. The method according to claim 52, wherein each PTSE is encapsulated within PNNI Topology State Packets (PTSP).

54. A network element for synchronization of topology state information between two network nodes in a communications network, the communications network comprising a routing protocol for intermittent advertisement of local state information throughout the network, the two network nodes comprising a requesting node which initiates a request for topology state synchronization and a replying node which receives said request and which communicates with the requesting node to provide topology state information to the requesting node which is not possessed by the request node when same initiates said request, the network element selectively operating in one of two modes of synchronization, wherein a first mode thereof effects topology state synchronization between the requesting node and the replying node which entails withdrawal, by the said requesting node and by the said replying node, of the said intermittent advertisement of local state information as it pertains respectively to the requesting node and to the replying node, and wherein a second mode thereof effects topology state synchronization between the requesting node and the replying node which maintains the said intermittent advertisement of local state information as it pertains respectively to the requesting node and to the replying node.

55. The network element according to claim 54, wherein topology state information is exchanged between the requesting node and the replying node once the request for topology state synchronization has been made by the requesting node to the replying node.

56. The network element according to claim 55, wherein prior to the said exchange of topology state information, the requesting node notifies the replying node that the said exchange is to take place according to one of the said first mode and the said second mode of synchronization.

57. The network element according to claim 56, wherein said notification takes place by way of a flag in a notification message sent by the requesting node to the replying node.

58. The network element according to claim 56, wherein the topology state information which is exchanged between the requesting node and the replying node is extracted from topology state databases each respectively associated with the said requesting and replying nodes.

59. The network element according to claim 57, wherein the communications network is an Asynchronous Transfer Mode (ATM) network and the routing protocol for intermittent advertisement of local state information throughout the network is the PNNI protocol.

60. The network element according to claim 57, wherein the communications network is an Internet Protocol (IP) network and the routing protocol for intermittent advertisement of local state information throughout the network is the Open Shortest Path First (OSPF) protocol.

61. The network element according to claim 59, wherein the notification message is a PNNI Database Summary packet in which said flag is provisioned.

62. The network element according to claim 61, wherein the topology state information is exchanged by bundling the topology state information into Pi Topology State Elements (PTSE).

63. The network element according to claim 62, wherein each PTSE is encapsulated within PNNI Topology State Packets (PTSP).

64. A method for synchronization of topology state information between a first network node and a second network node in a communications network, the communications network comprising a routing protocol for exchange of local state information throughout the network, the first network node initiating a request for topology state synchronization and the second network node receiving said request and communicating with the first network node to provide topology state information to the first network node, the topology state synchronization taking place according to a first mode thereof wherein the said exchange of local state information, as it pertains respectively to the first network node and to the second network node, is not withdrawn.

65. The method according to claim 64, wherein a second mode of topology state synchronization is provided, the second mode of topology state synchronization entailing withdrawal, by the first network node and by the second network node, of the said exchange of local state information as it pertains respectively to the first network node and to the second network node.

66. The method according to claim 65, further comprising the step of selecting, prior to said request being initiated by the first network node to the second network node, between the first mode of topology state synchronization and the second mode of topology state synchronization.

67. The method according to claim 66, wherein the second network node communicates with the first network node to provide topology state information to the first network node which is not possessed by the first network node when same initiates said request.

68. The method according to claim 67, wherein prior to the said exchange of topology state information, the first network node notifies the second network node that the said exchange of topology state information is to take place according to one of the said first mode and the said second mode of synchronization.

69. The method according to claim 68, wherein said notification takes place by way of a flag in a notification message sent by the first network node to the second network node.

70. The method according to claim 69, wherein the topology state information which is exchanged between the first network node and the second network node is extracted from topology state databases each respectively associated with the said first and second network nodes.

71. The method according to claim 70, wherein the communications network is an Asynchronous Transfer Mode (ATM) network and the routing protocol for exchange of local state information throughout the network is the PNNI protocol.

72. The method according to claim 70, wherein the communications network is an Internet Protocol (IP) network and the routing protocol for exchange of local state information throughout the network is the Open Shortest Path First (OSPF) protocol.

73. The method according to claim 71, wherein the notification message is a PNNI Database Summary packet in which said flag is provisioned.

74. The method according to claim 73, wherein the topology state modification is exchanged by bundling the topology state information into PNNI Topology State Elements (PTSE).

75. The method according to claim 74, wherein each PTSE is encapsulated within PNNI Topology State Packets (PTSP).

76. A network element for synchronization of topology state information between a first network node and a second network node in a communications network, the communications network comprising a routing protocol for exchange of local state information throughout the network, the first network node initiating a request for topology state synchronization and the second network node receiving said request and communicating with the first network node to provide topology state information to the first network node, the topology state synchronization taking place according to a first mode thereof wherein the said exchange of local state information, as it pertains respectively to the first network node and to the second network node, is not withdrawn.

77. The network element according to claim 76, wherein a second mode of topology state synchronization is provided, the second mode of topology state synchronization entailing withdrawal, by the first network node and by the second network node, of the said exchange of local state information as it pertains respectively to the first network node and to the second network node, the network element selectively operating in one of the two said modes of topology state synchronization.

78. The network element according to claim 77, wherein prior to said request being initiated by the first network node to the second network node, the network element selects between the first mode of topology state synchronization and the second mode of topology state synchronization.

79. The network element according to claim 78, wherein prior to said request being initiated by the first network node to the second network node, the first network node notifies the second network node that the said exchange of topology state information is to take place according to one of the first mode of topology state synchronization and the second mode of topology state synchronization.

80. The network element according to claim 79, wherein the second network node communicates with the first network node to provide topology state information to the first network node which is not possessed by the first network node when same initiates said request.

81. The method according to claim 80, wherein said notification takes place by way of a flag in a notification message sent by the first network node to the second network node.

82. The method according to claim 81, wherein the topology state information which is exchanged between the first network node and the second network node is extracted from topology state databases each respectively associated with the said first and second network nodes.

83. The method according to claim 82, wherein the communications network is an Asynchronous Transfer Mode (ATM) network and the routing protocol for exchange of local state information throughout the network is the PNNI protocol.

84. The method according to claim 82, where the communications network is an Internet Protocol (IP) network and the routing protocol for exchange of local sate information throughout the network is the Open Shortest Path First (OSPF) protocol.

85. The method according to claim 83, wherein the notification message is a PNNI Database Summary packet in which said flag is provisioned.

86. The method according to claim 85, wherein the topology state information is exchanged by bundling the topology state information into PNNI Topology State Elements (PTSE).

87. The method according to claim 86, wherein each PTSE is encapsulated within PNNI Topology State Packets (PTSP).

* * * * *